G. M. STERNBERG.
Damper Regulator.

No. 105,272. Patented July 12, 1870.

Witnesses:
Louis Allou Farnyhy.
James Hodge.

Inventor.
George M. Sternberg.

United States Patent Office.

GEORGE MILLER STERNBERG, OF FORT RILEY, KANSAS.

Letters Patent No. 105,272, dated July 12, 1870.

ELECTRO-MAGNETIC APPARATUS FOR REGULATING VALVES AND DAMPERS.

The Schedule referred to in these Letters Patent and making part of the same.

I, GEORGE MILLER STERNBERG, of Fort Riley, in the county of Davis, State of Kansas, have invented certain Improvements in Machines for Regulating Dampers and Valves, of which the following is a specification.

These improvements have for their object the simplification of the mechanism described in Letters Patent No. 100,462, granted me March 1, 1870, by the substitution of a single train of wheels, moved by a weight, coiled spring, or otherwise, for the double clock-mechanism described in said Letters Patent.

Also, a more perfect action of the spur-gears $b'$ $b''$ by detaching them from the lever $b$, and placing them each at the extremity of an independent lever, the opposite extremity of which is acted upon by the lever $b$.

Also, the addition of the wheels $f$ and $g$, which take the place of the windlasses $d'$ $d'''$, the cord $d'''$, and the wheel $e$, described in said Letters Patent No. 100,462.

Description of the Accompanying Drawing.

Like parts are lettered as in the drawing making part of the specification in Letters Patent No. 100,462.

In the drawing—

Figure 1:
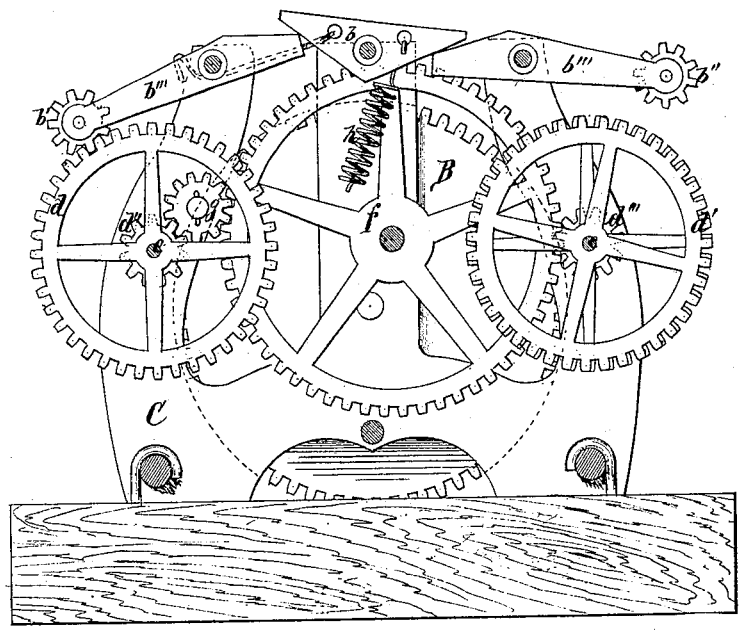
Figure 1 is a side elevation, with the supporting frame removed from the side shown.
Figure 2:
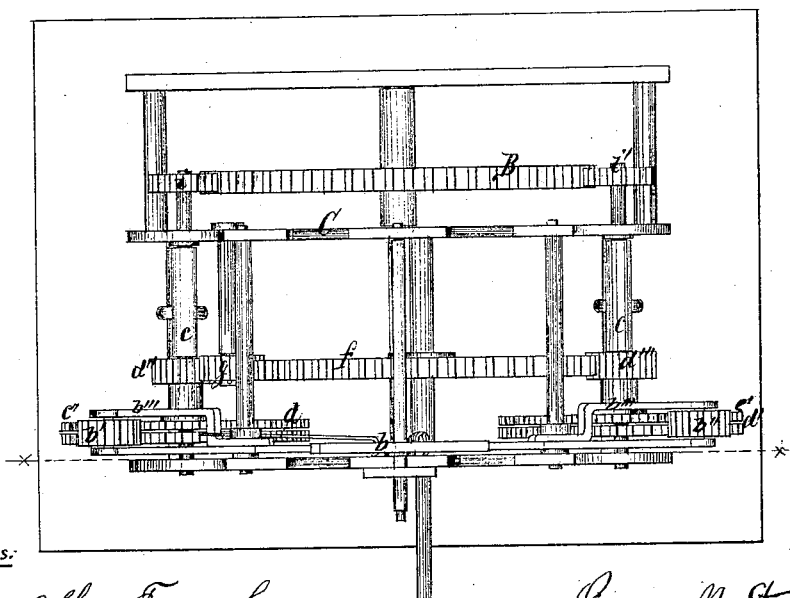
Figure 2 is a plan view.

B is one of a train of wheels, (the others not being drawn,) by which regular and continuous motion, obtained by means of a coiled spring, or otherwise, and regulated by a fly-wheel, pendulum, or otherwise, is transmitted to the wheels $c'$ $c''$ by means of the small wheels $i$ $i'$, attached to their shaft $c$.

The spring $h$, acting upon the lever $b$, causes it to depress one extremity of the lever $b'''$, and to elevate its opposite extremity, together with the spur-gear $b'$ which it carries, thus separating the spur-gear $b'$ from its connection with the wheels $c''$ $d$, and allowing them to revolve independently of each other.

At the same time, the spur-gear $b''$ is allowed, by its own weight, assisted, when necessary, by a slight spring, to fall upon and engage the wheels $c'$ $d'$, causing the wheel $d'$, which is loose upon the shaft $c$, to revolve in unison with the wheel $c'$ the same as if it were fast to the shaft.

The small wheel $d'''$ is fast to the wheel $d'$, (as is likewise the wheel $d''$ to $d$,) and serves to communicate the motion of the wheel $d'$, when it is in gear with $c'$, to the wheels $g$ and $f$.

The wheel $g$ is interposed between $d'''$ and $f$, for the purpose of causing $f$ to revolve in the same direction with $d'$.

The shaft of the wheel $f$ passes through the frame-work C, and may be made the shaft of the valve it is desired to regulate, or it may be made to transmit its motion to such valve or damper by means of a cord or band passing around a pulley attached to its shaft, or otherwise.

When the wheel B is in motion, through the wheels $i'$, $c'$, $d'$, $d'''$, and $g$ upon one side, and the wheels $i$, $c''$, $d$, and $d''$ on the other, the wheel $f$ is caused to move continuously, either to the right or to the left, according as the spur-gear $b''$ engages the wheels $c'$ $d'$, or the spur-gear $b'$ engages the wheels $c''$ $d$.

The lever $b$, by which the spur-wheels $b'$ $b''$ are thrown in and out of gear, is operated by the spring $h$ on one side, and a lever, $a'''$, not here shown, upon the other.

The operation of the lever $a'''$, carrying an armature, $a''$, is fully explained in Letters Patent No. 100,462.

Having thus described my invention,

What I claim as new, and desire to secure by Letters Patent, is—

The single system of train-work, in combination with the wheels $g$, $f$, $d''$, and $d'''$, the levers $b'''$, and the lever $b$, operating in the manner and for the purpose substantially as described.

GEO. M. STERNBERG.

Witnesses:
 LOUIS ETHAN FARINGBY,
 JAMES HODGE.